No. 669,753. Patented Mar. 12, 1901.
G. T. LAMONT.
CHILD'S VEHICLE.
(Application filed Dec. 4, 1900.)
(No Model.) 2 Sheets—Sheet 1.
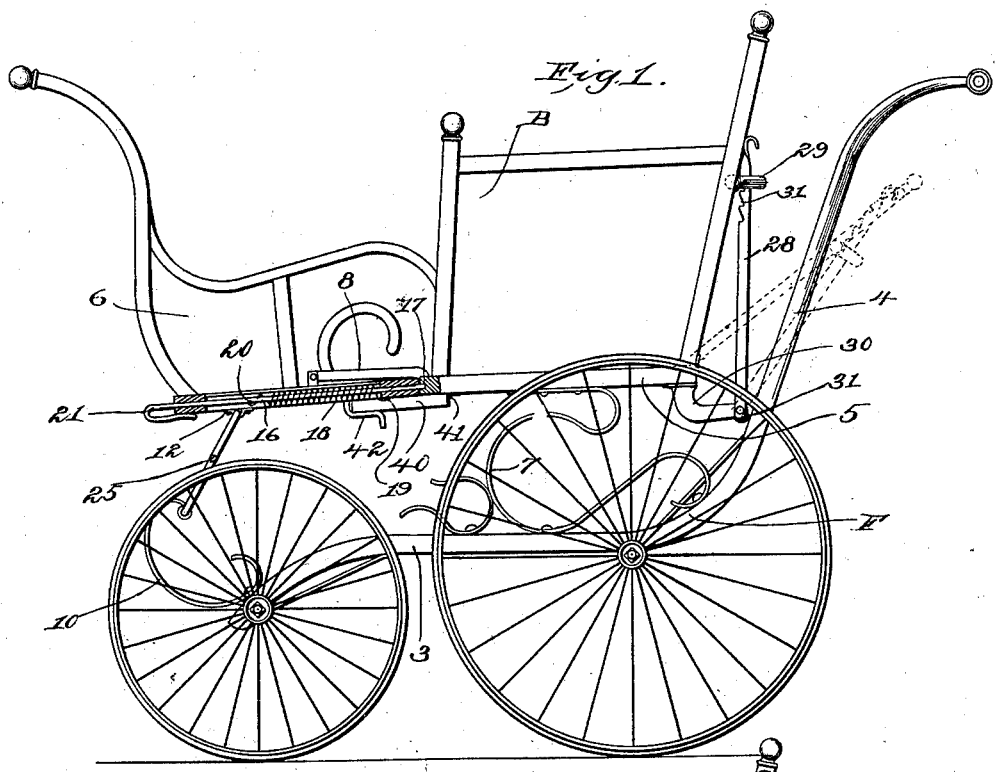
Witnesses.
W. C. Lunsford
A. B. Kaiser.
Inventor
George T. Lamont
by Newberry & Gregory,
Atty's.

No. 669,753. Patented Mar. 12, 1901.
G. T. LAMONT.
CHILD'S VEHICLE.
(Application filed Dec. 4, 1900.)
(No Model.) 2 Sheets—Sheet 2.
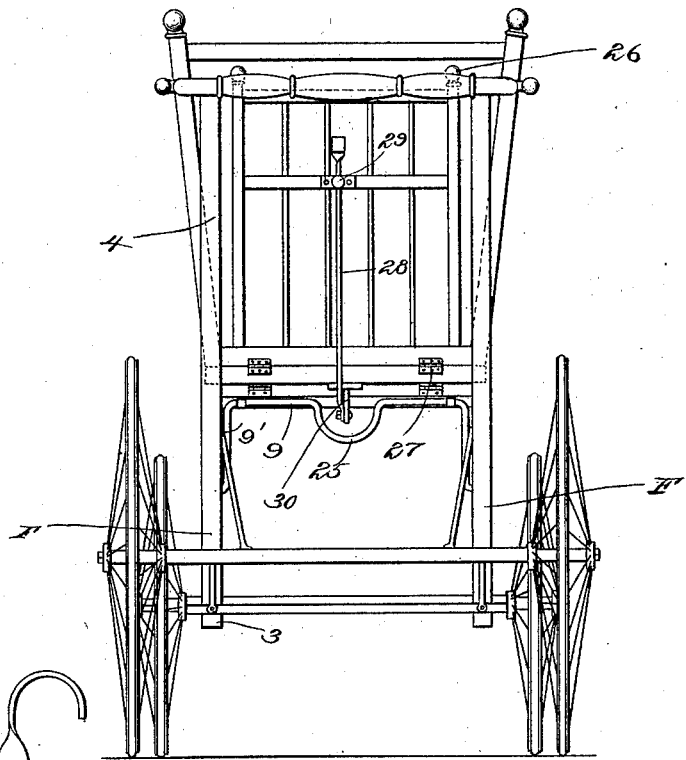
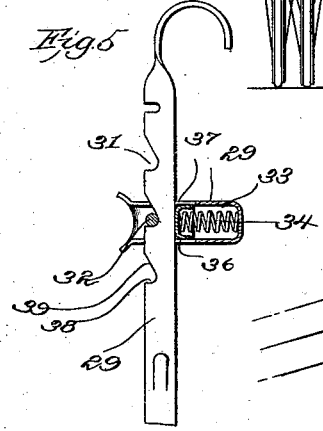
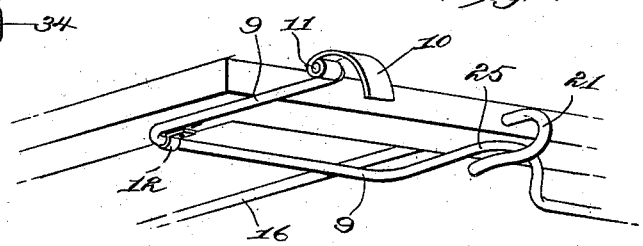
Witnesses
W. C. Lunsford.
John J. McGaugill
Inventor:
George T. Lamont.
by Crosby & Gregory,
Atty's.

UNITED STATES PATENT OFFICE.

GEORGE T. LAMONT, OF LEOMINSTER, MASSACHUSETTS, ASSIGNOR TO WHITNEY REED CHAIR COMPANY, OF SAME PLACE.

CHILD'S VEHICLE.

SPECIFICATION forming part of Letters Patent No. 669,753, dated March 12, 1901.

Application filed December 4, 1900. Serial No. 38,623. (No model.)

*To all whom it may concern:*

Be it known that I, GEORGE T. LAMONT, a citizen of the United States, and a resident of Leominster, county of Worcester, and State of Massachusetts, have invented an Improvement in Children's Vehicles, of which the following description, in connection with the accompanying drawings, is a specification, like characters on the drawings representing like parts.

This invention relates to vehicles which are convertible at will into a baby-carriage or a go-cart; and the object of the invention is to provide a device which is simple, compact, and easily adjustable from a baby-carriage to a go-cart, and vice versa.

In carrying out my invention I make the body of the vehicle in two sections, the rear or seat section being fixed upon the frame, while the front or foot section is vertically movable, the said front section when in its elevated position being on a level with the rear section and abutting the same to form therewith the body of a baby-carriage and when in its lowered position forming the foot-rest of a go-cart.

In order to provide a simple and convenient way of mounting the movable front section for vertical adjustment, I connect the same to the rear section by suitable links, which are pivoted to the front edge of the rear section and to the front section intermediate its ends, this pivotal connection allowing for bodily moving the front section from its lowered position to its elevated position. I further support the front end of the front section upon a suitable bail, which is pivoted to the frame of the vehicle, the bail by its pivotal construction serving not only to sustain the front section in either of its two adjusted positions, but also serving, in connection with a suitable locking-bolt, to lock the said front section in its lowermost position. I may, if desired, construct the rear section with an adjustable back, which may be inclined more or less.

Referring to the drawings, Figure 1 illustrates a vehicle embodying my invention when adjusted for use as a baby-carriage. Fig. 2 illustrates the position of the front section when lowered to make, with the rear section, a go-cart. Fig. 3 is a rear view of the vehicle. Fig. 4 is a detail showing a portion of the bail from beneath, and Fig. 5 is a detail of the locking device to hold the back in its adjusted position.

The frame of the vehicle is denoted by F, and this comprises the base portion 3, to which the front and rear axles are connected in any suitable way, and the upwardly-projecting portion 4, which forms the handle for propelling the vehicle, as usual in this class of devices.

The frame may be of any suitable construction and forms no part of my present invention, which relates especially to the body, (designated generally by B.)

The body B comprises two sections, the rear seat-section 5, which is fixed in position, and the vertically-movable front section 6, which can be adjusted to change the vehicle from a baby-carriage to a go-cart.

The design for the front and rear sections of the body may be of any desired character, that illustrated in the drawings being a simple scroll in order to avoid confusion in the drawings. The rear section 5 is mounted upon the springs 7, which may be of any suitable shape, and are carried by the base portion 3 of the frame F. The front section 6, which comprises a suitable floor and a dash, is mounted for movement relative to the rear section 5 bodily in a vertical direction, preferably by connecting the same to the rear section by means of the links 8, said links being suitably pivoted at one end to the front of the rear section and at the other end to the front section intermediate its ends. The front end of the front section is supported upon the bail device 9, which is pivoted to the front springs 10 in any suitable way, as by constructing the arms 9' of the said bail with the offset portions 11, which engage suitable loops in the upper end of the spring 10, as best seen in Fig. 4, and the said bail 9 is pivotally supported in suitable eyes 12 on the under side of the front section 6. With this construction it will be evident that with the front section in its elevated position, as shown in Fig. 1, in order to lower the same to the position shown in Fig. 2 it is simply necessary to depress the rear end of the said front section below the floor of the section 5, when the said section will swing upon the links 8 and bail 9 to the position shown in Fig. 2, in which position the floor of the said front section 6 rests upon the arms 9' of the bail device 9, and thus is firmly supported. In order to support the front end of the said front section when in its lowered position, I construct the spring 7 with the spring-clip 13, the said clip having one arm 14, upon which the floor of the said front section rests, and another arm 15 projecting above the floor and serving to prevent the same from vertical movement.

When it is desired to bodily raise the vertically-movable section 6, the front end thereof is first lifted and swung about the bail 9, when the rear end of said section can be withdrawn from the clip 13 and the said section raised to the position shown in Fig. 1. It will thus be seen that I have provided a vehicle-body comprising a fixed rear section and a bodily vertically movable front section, the front section when in its elevated position being on a level with and abutting the rear section to thus form a baby-carriage, and when in its lowered position converting the vehicle into a go-cart, and the floor of said front section being approximately horizontal in both of its adjusted positions.

In order to lock the vertically-movable front section in either of its adjusted positions, I provide the spring-pressed locking-bolt 16, which is slidably supported in the floor of the front section and normally projects slightly beyond the rear edge thereof.

The rear section 5 is provided with a suitable socket 17, in which the end of the bolt 16 projects when the front section is elevated, as shown in Fig. 1, thus locking the front section in this position. A suitable coiled spring 18, fastened at one end, as at 19, to the front section and fastened at the other end, as at 20, to the bolt 16, serves to normally maintain the bolt in its operative position. The head 21 of the bolt projects beyond the front end of the front section, the said head being hook-shaped for purposes which will be presently described.

As illustrated in Figs. 3 and 4, the bail 9 has centrally thereof the cranked portion 25, which is in the same plane as the arms 9', so that when the front section 6 is in its lower position and resting upon the said arms 9' the cranked portion 25 also lies flat against the bottom thereof. While the front section is being swung into its lowermost position the locking-bolt 16 is withdrawn, and after the front section 6 reaches its lowermost position, with the cranked portion 25 of the bail 9 lying against the under side of the floor of said front section, the bolt 25 is projected forward and the hook 21 thereof caught under the cranked portion 25, as illustrated in Fig. 4, thus serving to positively lock and hold the front section 6 in its lower position. It will thus be seen that the locking-bolt 16 operates to lock the front section 6 in either of its adjusted positions.

In some instances it is desirable to make the back of the carriage adjustable, so that the same can be set at different inclinations, and I may therefore, if desired, provide the vehicle illustrated with an adjustable back 26, the said back being of any suitable construction and being hinged to the floor of the seat or rear section 5 by any usual hinges 27. The back is held in any adjusted position by means of the brace or arm 28 and its coöperating keeper 29, these parts being illustrated in detail in Fig. 5. The brace or arm 28 is pivotally mounted to an arm 30, attached to the seat-section 5, the pivotal point 31 of the brace 28 with the arm 30 being below and to the rear of the pivotal point of the back 26 with the bottom of the seat-section 5. The brace or arm 28 is serrated on one face, as at 31, and the keeper 29, which is slotted and through which the brace 28 passes, is provided with a fixed stop 32, adapted to engage the various serrations 31 in the arm, according to the height to which the back is to be adjusted. The keeper is preferably made cylindrical in form, and the chamber 33 therein is provided with a suitable coiled spring 34, which serves to hold the brace or arm 28 against the stop 32, as plainly seen in Fig. 5. Preferably a backing-piece 37 will be used between the spring and the arm. By simply moving the upper end of the arm to the rear against the spring 34 it will be obvious that the notches or serrations 31 may be disengaged from the stop 32 and the back adjusted to any suitable position. Preferably the serrations 31 will be of the form illustrated in Fig. 5, they having the square shoulder 38 and the inclined shoulder 39, so that when it is desired to raise the back from the inclined position to the vertical position the stop 32 will slide over the inclined shoulders 39, thus obviating the necessity of manipulating the brace 28.

As shown in Fig. 2, when the movable section 6 is in its lower position the floor thereof is some distance below the floor of the fixed section 5, which constitutes the seat of the go-cart, and in order to fill this space I preferably provide a suitable filling-piece 40, which extends clear across the body of the vehicle and is hinged, as at 41, underneath the floor of the fixed section 5. This filling-piece 40 is of such a width as to exactly occupy the space between the floors of the sections 5 and 6 when the body is converted into a go-cart, and when the front section 6 of the body is raised to the position shown in Fig. 1 the filling-piece 40 may be swung up under the said front section and held there by the arm 42, pivotally mounted in the bottom of the front section 6. This filling-piece, therefore, besides being of utility when the vehicle is in the form of a go-cart, operates as a strengthening-piece to the joint between the front and rear sections when the vehicle is used as a baby-carriage.

It will be obvious to those skilled in the art that various changes may be made in the construction of my device without departing from the spirit of my invention, which consists in providing a vehicle with a two-section body, one of the sections thereof being fixed and the other being bodily movable vertically, the said movable section when in its elevated position abutting the fixed section and forming therewith the body of the baby-carriage and when lowered forming with the said fixed section a go-cart, and it will be noticed that in each of its adjusted positions the floor of the front section is approximately horizontal.

Having described my invention, what I claim as new, and desire to secure by Letters Patent, is—

1. A vehicle having a body comprising a fixed rear section, and a movable front section, said front section being adapted to be bodily raised or lowered and when raised being on a level with and abutting the rear section to form therewith the body of the baby-carriage, and when lowered forming the foot-support of a go-cart.

2. A combination baby-carriage and go-cart having a body comprising a fixed rear section, and a movable front section, said front section being adapted to be bodily raised or lowered and when elevated being on a level with and abutting the rear section, and adapted to form with the same the body of a baby-carriage, and locking means to hold said front section in its elevated position.

3. A combination baby-carriage and go-cart having a body comprising a fixed rear section, a vertically-movable front section, and links connecting said front and rear sections, the front section when elevated being on a level with and abutting the rear section to form therewith a baby-carriage body, and, when lowered, acting as the foot-support of a go-cart.

4. A combination baby-carriage and go-cart having a body comprising a fixed rear section, a vertically-movable front section, links connecting said front and rear sections, the front section when elevated forming with the rear section the body of a baby-carriage and when lowered forming therewith a go-cart body, and means to lock the front section in either of its adjusted positions.

5. In a combination baby-carriage and go-cart, a vehicle-frame having front and rear springs, a rear body-section supported on the rear springs, a vertically-movable front body-section supported on the front springs and pivotally connected with the rear body-section, whereby when the front body-section is elevated it forms, with the rear body-section, a baby-carriage, and when lowered it forms therewith a go-cart.

6. In a vehicle, a frame having front and rear springs, a rear body-section supported on the rear springs, a vertically-movable front body-section pivotally mounted on the front springs and pivotally connected to the rear section.

7. A vehicle having a frame provided with front and rear springs, a rear body-section supported on the rear springs, a vertically-movable front body-section, and links pivotally connecting the front body-section to the front springs and to the rear body-section, whereby said front body-section may be adjusted to form with the rear body-section either a baby-carriage or a go-cart.

8. A combination baby-carriage and go-cart having a body comprising a rear section, a vertically-movable front section, said front section when elevated being on a level with and abutting the rear section to form therewith a baby-carriage body, and when lowered forming therewith a go-cart body, and a filling-piece pivoted to the rear section and adapted to fill the space between the two sections when the body is adjusted as a go-cart body.

9. A combination baby-carriage and go-cart having a body comprising a fixed rear section, a vertically-movable front section pivotally connected to the rear section and to the frame of the vehicle, the said front section having its floor approximately horizontal in each of its adjusted positions and the said rear section having an adjustable back.

10. A vehicle having a body comprising a fixed rear or seat section, a vertically-movable front section, links pivotally connected to the front section intermediate its length and to the rear section, whereby said front section may be raised to the level of and abut the rear section to form a baby-carriage body and to be lowered bodily below the rear section to form a go-cart body, and means to hold the front section in either adjusted position.

11. A combination baby-carriage and go-cart comprising a frame, a rear section fixed thereon, a vertically-movable front section pivotally connected to said rear section, a bail pivotally connecting said front section to the frame of the vehicle, said bail having a cranked portion, and means coöperating with said cranked portion of the bail to lock the front section in its lowest position.

12. A combination baby-carriage and go-cart comprising a frame, a rear body-section fixed thereon, a vertically-movable front body-section pivotally connected to said rear body-section, a bail pivotally connecting said front body-section to the frame, whereby the front body-section may be raised or lowered to form with the rear body-section either a baby-carriage or a go-cart, said bail having a cranked portion, a locking-bolt slidingly mounted on the front body-section and having a hook at one end, said bolt being adapted to project into a socket in the rear body-section to hold the said front body-section elevated, and to have its hook engage the cranked portion of the bail to hold the front body-section lowered.

13. A baby-carriage comprising a body and an adjustable back, locking means to hold the back in its adjusted positions, said means comprising a slotted keeper fixed on the back and having a stop, an arm pivoted to the body of the vehicle and having notches therein to engage the stop, said arm playing in the slot of the keeper, and a spring in said keeper to normally maintain the engagement of the arm with the stop.

14. A vehicle having a body comprising a fixed rear section, a vertically-movable front section, said front section when elevated being on a level with the rear section to form therewith the body of the baby-carriage, and when lowered forming the foot-support of a go-cart, the floor of said movable front section being approximately horizontal in either of its adjusted positions.

15. A vehicle having a frame, a body supported therein, said body comprising a fixed rear section, a vertically-movable front section, pivotally connected to the frame, said front section, when elevated forming with the rear section the body of a baby-carriage, and when lowered forming the foot-support of a go-cart, and the floor of said front section being approximately horizontal in either of its adjusted positions.

In testimony whereof I have signed my name to this specification in the presence of two subscribing witnesses.

GEORGE T. LAMONT.

Witnesses:
GEO. W. GREGORY,
MARGARET A. DUNN.